US010989561B2

(12) United States Patent
Paturle et al.

(10) Patent No.: US 10,989,561 B2
(45) Date of Patent: *Apr. 27, 2021

(54) METHOD FOR MAPPING DATA RELATING TO ROAD CONDITIONS

(71) Applicant: COMPAGNIE GENERALE DES ETABLISSEMENTS MICHELIN, Clermont-Ferrand (FR)

(72) Inventors: Antoine Paturle, Clermont-Ferrand (FR); Clément Petit, Clermont-Ferrand (FR); Frédéric Terrettaz, Clermont-Ferrand (FR)

(73) Assignee: COMPAGNIE GENERALE DES ETABLISSEMENTS MICHELIN, Clermont Ferrand (FR)

( * ) Notice: Subject to any disclaimer, the term of this patent is extended or adjusted under 35 U.S.C. 154(b) by 196 days.

This patent is subject to a terminal disclaimer.

(21) Appl. No.: 16/063,594

(22) PCT Filed: Dec. 14, 2016

(86) PCT No.: PCT/FR2016/053423
§ 371 (c)(1),
(2) Date: Jun. 18, 2018

(87) PCT Pub. No.: WO2017/103474
PCT Pub. Date: Jun. 22, 2017

(65) Prior Publication Data
US 2019/0003852 A1      Jan. 3, 2019

(30) Foreign Application Priority Data

Dec. 17, 2015  (FR) ..................... 1562578

(51) Int. Cl.
*B60R 22/00*    (2006.01)
*E05F 15/00*    (2015.01)
(Continued)

(52) U.S. Cl.
CPC ......... *G01C 21/3691* (2013.01); *G01C 21/26* (2013.01); *G01S 19/03* (2013.01);
(Continued)

(58) Field of Classification Search
CPC ..... G01C 21/3691; G01C 21/26; G01S 19/03; G06Q 10/00; G06Q 50/10; G06T 15/00; G06F 16/29
(Continued)

(56) References Cited

U.S. PATENT DOCUMENTS

2013/0155061 A1\* 6/2013 Jahanshahi ............. G06T 15/00
                                                        345/419
2015/0106299 A1\* 4/2015 Rennie ................... G06Q 10/00
                                                        705/345
(Continued)

*Primary Examiner* — Mahmoud S Ismail
(74) *Attorney, Agent, or Firm* — Venable LLP (57) ABSTRACT

A method for mapping data relating to the conditions on a road, the method including the following steps: (a) a step for recording, in a database, information relating to the weather conditions on a road, determined by a vehicle travelling on the road, (b) a step for recording the GPS position of the vehicle corresponding to the recordings made, and (c) a step for displaying, on a map showing the route followed by the vehicle, the weather conditions as a function of the GPS position.

17 Claims, 4 Drawing Sheets

(51) Int. Cl.
*G05D 1/00* (2006.01)
*G05D 3/00* (2006.01)
*G06F 7/00* (2006.01)
*G06F 17/00* (2019.01)
*G06F 7/70* (2006.01)
*G01C 21/36* (2006.01)
*G01C 21/26* (2006.01)
*G06F 16/29* (2019.01)
*G01S 19/03* (2010.01)
*A01B 69/00* (2006.01)
*B62D 6/00* (2006.01)
*B62D 11/00* (2006.01)
*B62D 12/00* (2006.01)
*B63G 8/20* (2006.01)
*B63H 25/04* (2006.01)
*G06T 15/00* (2011.01)

(52) U.S. Cl.
CPC .......... *G06F 16/29* (2019.01); *B60T 2210/10* (2013.01); *B60T 2210/36* (2013.01)

(58) Field of Classification Search
USPC .............................. 701/49, 345, 41; 345/419
See application file for complete search history.

(56) References Cited

U.S. PATENT DOCUMENTS

2016/0009276 A1* 1/2016 Moeller ................ B60W 50/14
 701/41
2016/0349219 A1 12/2016 Paturle et al.

* cited by examiner

METHOD FOR MAPPING DATA RELATING TO ROAD CONDITIONS

BACKGROUND

The invention relates to a method for mapping data relating to the conditions on a road. The invention notably, but not exclusively, implements a method for detecting the conditions on a road and state of the tyres equipping a vehicle travelling along this road, based on the noise generated by the tyres when the latter come into contact with the ground.

Indeed, it turns out to be useful to know, at any moment in time, the conditions on the road or state of the tyres in order to interact with the driver or with the driver assistance systems, in such a manner as to inform them in real time of the changes in the driving conditions, and more generally, of the possible modification of the conditions of adherence of the tyres and of the road holding of the vehicle. These methods are therefore aimed at highlighting the variations in the weather conditions such as the passage between driving conditions on dry, damp, wet, snow-covered or icy ground.

In order for this data to be usable, it proves to be useful for it to be displayed so as to be readable and understandable for a user such as a vehicle driver.

Maps are thus known allowing the weather conditions over a certain route to be known in real time, for example using data supplied by meteorological services. However, although allowing a first idea of the driving conditions over a route to be obtained, they do not allow the road conditions to be precisely known at a given moment in time, information which could allow a driver, or the safety system of a vehicle, to adapt the driving conditions, and hence the risks of an accident to be reduced.

SUMMARY

Thus, the invention aims to overcome this shortcoming by providing a method for the mapping of data relating to the conditions on a road, the method comprising the following steps:
- A step for recording, in a database, information relating to the weather conditions on a road, determined by a vehicle travelling over the said road,
- A step for recording the GPS position of the vehicle corresponding to the recordings made,
- A step for displaying, on a map showing the route followed by the vehicle, the weather conditions as a function of the GPS position.

In one preferred embodiment, the weather conditions are included within the group comprising: a dry condition, a damp condition and a wet condition or a wintery condition such as a snow-covered or icy condition. A snow-covered condition may, in one preferred embodiment, be included within the group comprising a fresh snow condition, a compacted snow condition, a granular snow condition and a melting snow condition.

A damp condition is characterized by a height of water flush with the natural roughness undulations of the surfacing material on the road; this damp condition corresponds for example to the condition obtained by a light rain shower or a road drying out after heavy rain. A wet condition, on the other hand, is characterized by a height of water exceeding the level of the natural roughness undulations of the surfacing material on the road. In practice, the wet condition corresponds to a height of water generally in the range between 0.5 millimetres and 1 millimetre.

In another preferred embodiment, a method according to the invention is such that, during the recording step, information relating to the macro-texture of the road surface is also recorded, and in this case the display step also comprises the representation of this macro-texture. This macro-texture of the road surface is, preferably, included within the group comprising a closed state, a medium state and an open state.

A road surface is considered as a closed surface texture when it takes a smooth aspect without roughness, such as for example an asphalt having re-flowed after having been subjected to high temperatures. A road surface will be considered as open when the roughness is significant, for example such as that of a worn road surface or that of a country road having been quickly repaired using a surfacing layer produced by projection of stones onto asphalt. A medium surface texture describes all the road surfaces in a state that is intermediate between the two preceding states and, more particularly, describes new road surfaces.

The macro-texture of a road surface affects the properties of drainability of the water but also its acoustic properties. This texture is characterized by a "Mean Texture Depth", also referred to as "MTD". This MTD is measured by the sand-patch method, well known to those skilled in the art.

The various macro-textures may thus be categorized in the following manner: a road surface with a closed macro-texture has a PMT in the range between 0 and 0.4 millimeters. A road surface with a medium macro-texture has a PMT between 0.4 and 1.1 millimeters, and a road surface with an open macro-texture has a PMT greater than 1.1 millimeters.

It is noted here that the display of the weather conditions on the road and the display of the macro-texture of the road surface may be implemented independently from one another on two different maps, or may appear on the same map.

In yet another preferred embodiment, during the recording step, information is also recorded that relates to a sudden event affecting the conditions on the road, and in this case, the display step also comprises the representation of this event.

These events, also referred to as a "road hazard", correspond to obstacles or sudden modifications of the road surface, such as for example the presence of gravel, of earth or sand on the road, or else deteriorations such as pot holes. All of these events can have an influence on the driving conditions of a vehicle on the road, and it is therefore useful, in one embodiment, to be able to know its positioning on a road journey.

Thus, as previously mentioned, the invention is advantageously applicable as a driving aid for drivers or for safety systems installed on vehicles. In order for this aid to be relevant, and in view of the sudden and changing nature of the various elements having an influence on the road holding, it is useful for the mapping to be updated in real time. For this purpose, in one preferred embodiment, the various pieces of information relating to the conditions on the road are determined in real time by the vehicle, for example at a frequency of three determinations per second, and are immediately transmitted to a remote database. This transmission is carried out by a telecommunications means, for example by GSM.

In order to further improve the quality of the information provided on the map, in one advantageous embodiment of the invention, information and GPS positions coming from several different vehicles are recorded. Indeed, such a feature allows a larger amount of data relating to the conditions on the road over a given route to be obtained, and thus the "real time" aspect of the invention to be reinforced. This data is then re-organized in order for it to be displayed in the form of a single map for all of the vehicles.

In order to allow a correct updating of the data transmitted by various vehicles, it is useful, in one advantageous embodiment, for a method according to the invention to comprise the step for recording, in addition to the GPS position of the vehicle, the date and the time of the recording. Thus, it becomes possible to update the display if the recorded data relating to a segment of road for which data has already been displayed, as long as the recorded data has a date and a time that is later than the data having been previously displayed. It should be noted that this updating is particularly advantageous for the data relating to the weather conditions on the route or the sudden events. Indeed, the macro-texture of the road surface itself does not vary very quickly.

With respect to the sudden events, in one embodiment of the invention, it is possible to wait to receive consistent information from several vehicles before displaying the presence of an event, with the aim of rendering the data displayed more robust.

A method according to the invention may be used in several advantageous applications. Thus, in one example, such a method allows road holding properties to be estimated as a function of the various recordings made and of their GPS position, and this method furthermore comprises the step for displaying these characteristics on a map of the route. The term "road holding property" is understood for example to mean the drainability of the road, which may be estimated with regard to the macro-texture of the road surface. It may also be envisaged to combine the various types of data in order to obtain an indication on a level of adherence to the road. However, this data does not take into account the tyres nor the vehicles, and cannot therefore precisely determine the gripping coefficient for a vehicle travelling on a road.

In another advantageous application, a method according to the invention allows acoustic properties of the road surface to be estimated as a function of the various recordings made and of their GPS position over a route, and furthermore comprises the step for displaying these properties on a map. These properties are useful to know because they provide an indication on a potential level of noise generated by a vehicle travelling over the route. Indeed, it is known that the noise generated by a vehicle as it travels on a road surface depends on the properties of this road surface. Thus, it is for example known that the more a road surfacing texture is closed, the more it will excite the tread of a tyre and generate noise. The noise is all the more intense the newer the tread of the tyres. In the same way, an open road texture excites the modes of vibration of the tyres, which also generate noise outside of the vehicle, and this is independent of the condition of the tyres.

It is however noted that, as for the gripping properties, it is not possible to establish a precise map of the noise generated, since this noise depends on each vehicle, and also on the tyres and of their condition.

In another advantageous application, a method according to the invention comprises the step for determining, as a function of the various recordings made, areas of deterioration of the road surface, and furthermore comprises the step for displaying these areas on a map. Indeed, information such as the macro-texture of the road surface and the sudden events are useful for the users of the road and motorway networks, and can provide a knowledge in real time as to which areas of their networks require a maintenance action.

In yet another advantageous application, a method according to the invention comprises the step for identifying, as a function of the various recordings made, of the areas in which the weather conditions on the road are wintery, namely a snow-covered condition or an icy condition. Indeed, such information allows, the users of the road and motorway networks, to be aware of the areas of their networks requiring an action such as the salt-spreading in order to alleviate the wintery driving conditions.

In one preferred embodiment of the invention, the step for the determination by the vehicle of the weather conditions on the road or of the macro-texture of the road surface comprises the following steps:

a measurement of an acoustic signal produced by the tyres travelling over a surface of the road during a given time frame, a spectral power density of the acoustic signal over a given frequency interval is determined, the frequency interval is segmented into a plurality of frequency bands with previously determined widths, and with each frequency band is associated a data value representative of a measured mean acoustic power within the said frequency band, the representative data coming from a measurement forming variables of a vector associated with the said measurement, a condition of the road and of the tyres is determined corresponding to the vector associated with the measurement made, by means of a discriminating analysis of the data based on a learning database formed from a set of vectors associated with measurements previously carried out and recorded, according to the same steps as hereinabove, under known driving conditions according to parameters each representing given condition of the road and of the tyres, characterized in that the representative data forming the variables of the vector associated with a measurement is obtained by taking the ratio between the measured mean acoustic power within a frequency band and a measured total acoustic power over the entire frequency interval.

The determination of the conditions on the road is thus based on the observation that the acoustic frequency and the intensity generated by the tyres vary when the conditions on the road change, and analyses of the sound recordings made by microphones disposed near to the tyres and to the road. Based on the recording of a frequency spectrum of the acoustic powers, the weather conditions on the road are determined by means of appropriately chosen ratios or by comparing this spectrum with pre-recorded data.

The sound recordings are made by means of a microphone appropriately placed on the vehicle. The spectral density of the acoustic power is distributed over a given frequency interval. This spectrum varies as a function of a set of parameters such as the weather conditions, the state of the road, the degree of wear of the tyres, the type of tread on the tyres, and to a lesser extent, the tyre pressure, the load, etc. One of the major parameters likely to modify this spectrum, all the other conditions being equal, is the speed of the vehicle at the time when the measurement is made.

It has been demonstrated that this variation could in practice be neutralized if, instead of considering the power spectrum coming from the measurement, this spectrum is re-calculated by "normalizing" the measured data by means of the total acoustic power recorded during the measurement time over the entire frequency interval. The aim of this is to eliminate the speed effect and to render the measurement substantially invariant to this parameter.

The method is characterized in that the representative data forming the variables of a vector associated with a measurement are obtained by taking the ratio between the measured mean acoustic power within a frequency band and the measured total acoustic power over the entire frequency interval. In this way, in contrast to the existing methods in the prior art, it is no longer necessary to take the speed into account, in order to obtain, using a single acoustic measurement and without it being necessary to introduce additional parameters for interpreting the measurement, reliable information on the conditions on the road and, as will also be seen, on the state of the tyres.

The method according to the invention may also comprise, individually or in combination, the following features:
- The measured total acoustic power is equal to the sum of the mean acoustic powers of all the frequency bands of the frequency interval in question.
- The frequency bands are determined by dividing up the frequency interval by thirds of an octave.
- The time frame of a measurement is less than or equal to 0.5 seconds, and preferably less than or equal to 0.25 seconds.
- The frequency interval is in the range between 0 Hz and 20 KHz
- The frequency interval is in the range between 200 Hz and 20 KHz.
- A class of "weather" parameters, formed by various weather conditions over the route, comprises a dry condition, a damp condition and a wet condition.
- A class of "macro-texture of the road surface" parameters, formed by various states of the surfacing of the road, comprises a closed state, a medium state and a open state.
- A class of "wear" parameters, formed by various conditions of wear of the tyres, comprises a new condition, a half-used condition and a used condition.
- A class of "tread" parameters, formed by various types of tyre treads, comprises a summer type tread and a winter type tread.
- The discriminating analysis of the data includes the steps during which:
  - using the learning database, a reduced discriminating space is determined in which regions formed by each parameter or combination of parameters are identified,
  - the vector associated with a measurement in the said reduced discriminating space is transformed and, depending on the location of the said vector, a probability is associated with the measurement according to each of the parameters or combinations of parameters,
  - the most probable parameter is determined according to each of the classes of parameters.
- A parameter is associated with the measurement according to the "macro-texture of the road surface", "wear" or "tread" parameter, after having previously determined that the measurement has been carried out on a dry road.
- A probability is associated with the measurement according to each of the combinations of parameters containing this parameter, and the parameter of the class having the highest probability is assigned to this measurement.
- A diagnosis of the condition of the tyres is carried out according to the "wear" parameter or the "tread" parameter by combining the results of measurements carried out at different intervals of time.
- The acoustic signal generated by the tyres is measured by means of a microphone placed in the front part of a wheel arch situated at the rear of the vehicle.

Figure 1:
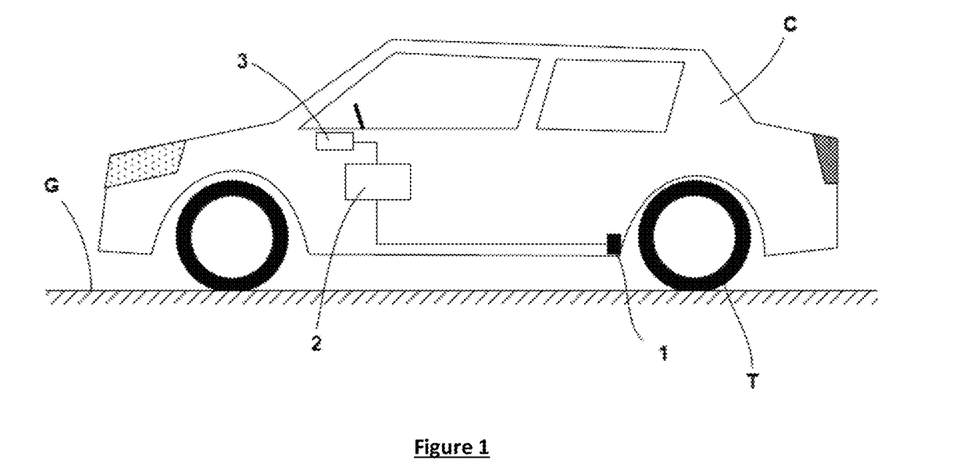
FIG. 1 shows a vehicle equipped with a device allowing the determination of conditions on the road.

In one preferred embodiment, the acoustic signal generated by the tyres (T) is measured by means of a microphone (1) placed in or on the vehicle. In FIG. 1, the microphone is placed in the front part of a wheel arch situated at the rear of the vehicle (C). However, other locations may be envisaged such as, for example, the rear bumper. The choice of the location for the microphone depends, for example, on the type of data that it is desired to estimate, on the type of vehicle and on the external constraints linked to its installation, to its maintenance, and to its durability.

BRIEF DESCRIPTION OF THE DRAWINGS

The invention will be better understood upon reading the appended figures, which are provided by way of examples that are in no way limiting, in which.

The following figures will be useful for the description of a method for determining the conditions on the road such as implemented in one particular embodiment of the present invention.

DETAILED DESCRIPTION

The vehicle C travelling over a ground G, represented schematically in FIG. 1, comprises front and rear wheel arches in which the wheels equipped with tyres T are accommodated.

When the vehicle C is moving, the tyres T generate a noise whose amplitude and frequency depend on multiple factors. This sound pressure is in fact the superposition of noise signals of various origins such as the noise generated by the features of the tread coming into contact with the ground G, by the movements of air between the tread elements, by the particles of water sucked up by the tyres, or again by the air flows linked to the speed of the vehicle. The monitoring of these noise signals is also superposed with the noise signals linked to the environment of the vehicle such as the noise of the engine. All these noise signals are also dependent on the speed of the vehicle.

A sound monitoring means, such as a microphone 1, is installed in or on the vehicle. It is noted here that various positions may be envisaged for the microphone, only one being shown in FIG. 1 but not limiting the scope of the invention to this configuration. Thus, the microphone may be positioned on a wall of the rear bumper, for example but not necessarily oriented in such a manner as to detect an acoustic signal coming from the rear of the vehicle.

It may also be envisaged to position it on a wall of the front bumper of a vehicle. The microphone may also be positioned in a wheel arch for monitoring the road rolling noise signals as close as possible to the place where they are generated. Ideally, it may be considered that the installation of a microphone in each of the wheel arches constitutes the best means for capturing all the road rolling noise signals generated by the tyres. However, for determining the conditions on the road (weather conditions and macro-texture of the road surface), a single microphone is sufficient. In the latter case, it is preferable to isolate it from the aerodynamic noise and noise from the engine.

It goes without saying that precautions of usage are taken for protecting the microphone from the external aggressions such as the projections of water, of mud or of gravel.

The vehicle also comprises a computer 2, connected to the microphone and configured for executing the operations allowing, as will be described in detail in the following, the raw information coming from the microphone to be conditioned and analyzed, and the conditions on the road or state of the tyres to be estimated as a function of a measurement of the acoustic power detected by the microphone.

As previously mentioned, it is noted here that "conditions on the road" is understood to mean one or more pieces of information from amongst: weather conditions on the road, the macro-texture of the road surface, or again a sudden event affecting the road. This information, determined in the vehicle by the computer 2, is transmitted, for example by GSM means installed in or connected to the computer, to an external database. It is accompanied by the GPS position of the vehicle at the time of the capture of the data having been used to determine the information. It is also, in one exemplary embodiment, accompanied by time-stamp information. It should be noted that this transmission may be carried out in real time, in order to allow the display to be updated in real time, or with a small time delay.

Once this information has been transmitted, it is then possible, in view of the presence of the GPS coordinates, to display the information on a map corresponding to the journey made by the vehicle transmitting the data.

Figure 2:
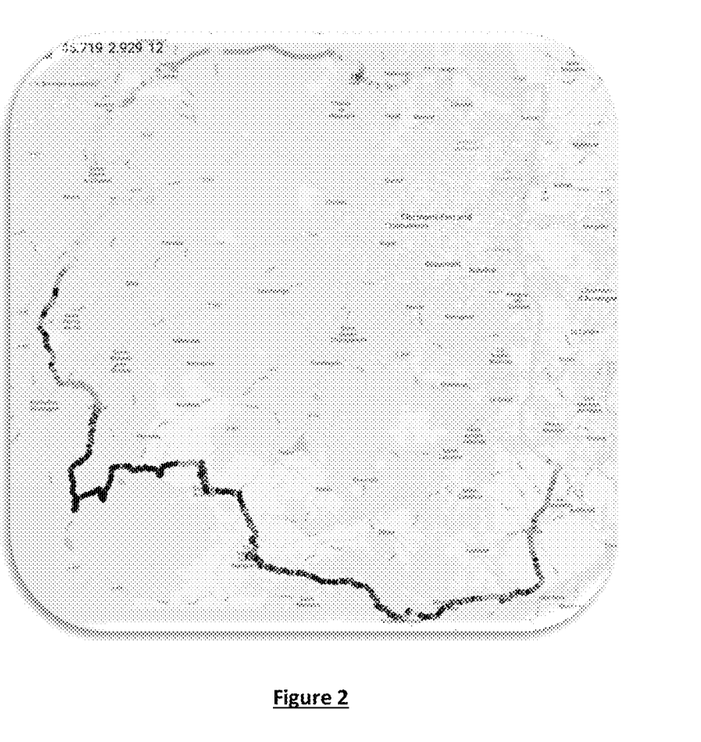
FIGS. 2, 3 show various displays of information determined by a vehicle, in the framework of the present invention.

Thus, FIG. 2 shows a road map on which has been superposed, over a given route, a line whose colour corresponds to the weather conditions on the road at this given location. Three colours have been used for this display: a dark colour corresponding to a wet condition, an intermediate colour corresponding to a damp condition, and a light colour corresponding to a dry condition.

Figure 3:
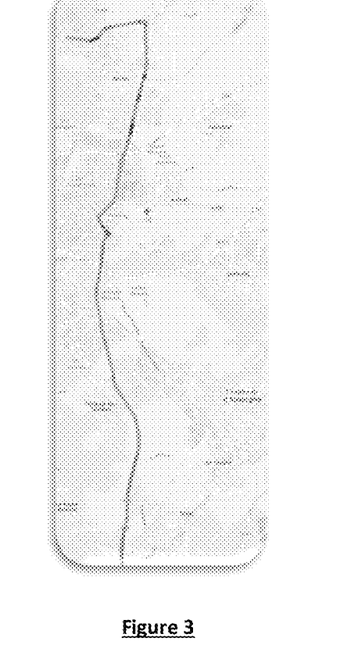

In another aspect of the invention, it is the macro-texture of the road surface which is the object of a display on a map. One example of such a map is shown in FIG. 3, on which a line with various colours is used to represent various states of the road surface. In this figure, the dark colour corresponds to a closed macro-texture, the intermediate colour corresponds to a medium macro-texture, and the light colour corresponds to an open macro-texture.

The data displayed on these maps comes from a single vehicle having followed the entire route. However, it is possible, in one exemplary embodiment of the invention, to display on the same map the information coming from various vehicles. This allows, on the one hand, a larger geographical area to be covered, and on the other hand, to have data available that is more regularly updated and hence more relevant.

Such maps may be made available to various stakeholders:
Drivers, in order to be made aware of the conditions on the road prior to undertaking the journey,
Motorway management or road maintenance services companies, in order to be made aware of the state of deterioration of the road surfaces, or the requirements for salting or sanding actions during wintery driving conditions,
Public bodies, in order to be made aware, based on this information, of "noisy" roads, and thus to be able to implement noise abatement means, etc.

With the aid of the following figures, a method allowing these various pieces of information on the conditions on the road to be determined using the acoustic measurements made by the microphone installed on the vehicle will now be described in detail. It is noted here that the invention is not reduced exclusively to this mode of determination.

Figure 4:
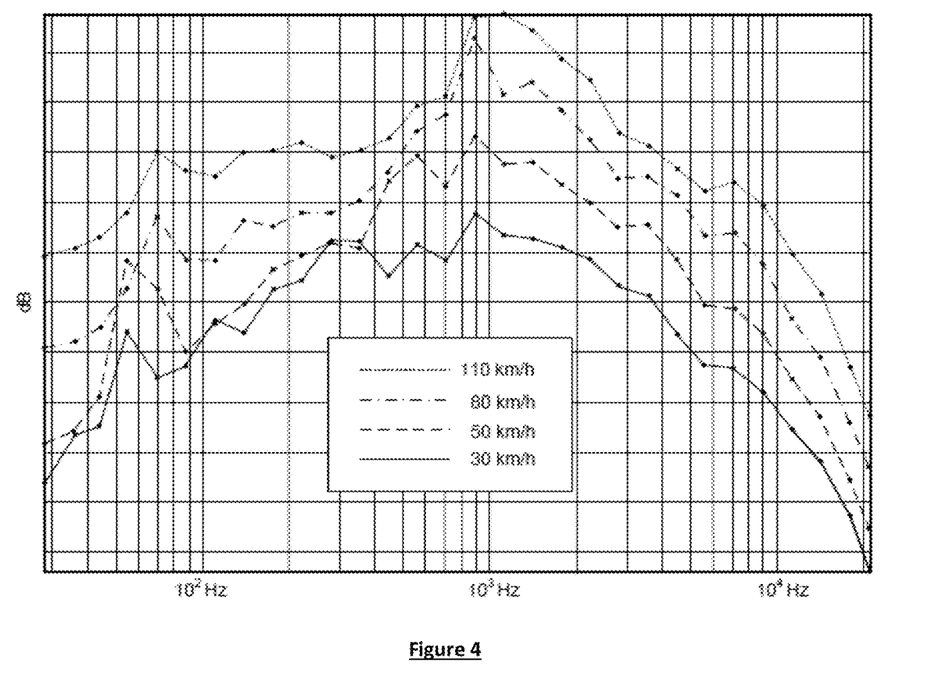
FIG. 4 shows a non-"normalized" acoustic power spectrum for measurements carried out at different speeds.

FIG. 4 is a spectral representation of the acoustic power recorded by the microphone during one time frame. A 'time frame' is understood to mean the interval of time, generally short, during which a recording is carried out on the basis of which the data is established that is used as the basis for one measurement. This time frame is less than or equal to 0.5 seconds or ideally less than or equal to 0.25 seconds.

This spectral representation shows the acoustic power received (in dB) as a function of the frequency, over a given frequency interval, here typically the audible frequency range in the range between 0 Hz and 20 KHz.

More specifically, the spectral representation in FIG. 4 is obtained by decomposing the frequency interval into frequency bands with predetermined widths, and by assigning to each frequency band a characteristic value equal to the mean power measured within this frequency band. A segmentation of the frequency interval by bands of thirds of an octave seems to be the most appropriate. Thus, each point of each of the curves in FIG. 4 represents a mean acoustic power for a given frequency band measured during one time frame under driving conditions in which, all other things being equal, only the speed is varied (typically from 30 kmh to 110 kmh).

It is then observed that the curves representing the spectral powers are shifted relative to one another, and that the total acoustic power dissipated increases as a function of the speed. Nevertheless, the general shape of the curves remains similar.

This observation is reproduced when one or more parameters from the other classes are changed and when the curves obtained by only varying the speed parameter are compared.

The total acoustic power over the whole of the frequency interval is then determined, which is equivalent to the surface area included between the curve and the abscissa axis and, for each frequency band, the mean power observed within this frequency band during a given time frame is divided by the total power recorded during this time frame over the entire frequency interval. This amounts to a kind of "normalization" of the measurement.

Figure 5:
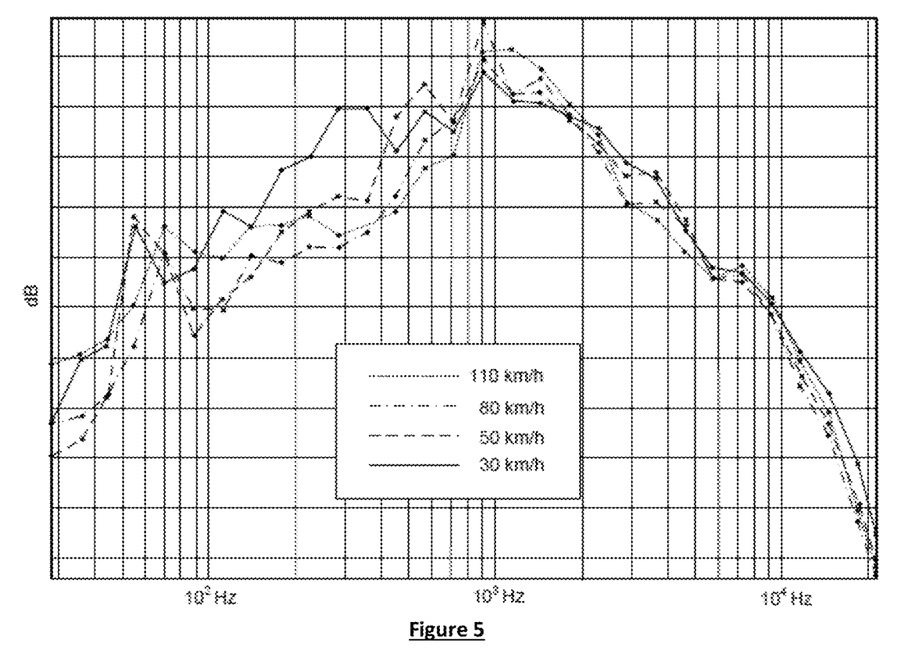
FIG. 5 shows the same power spectrum after "normalization".

In FIG. 5, it is then observed that the curves previously obtained have a substantial overlap and have profiles that are very close, in particular in the highest frequency bands and those that are the most representative of the acoustic phenomena previously described.

This "normalization" allows the effect linked to the speed to be neutralized, without however significantly modifying the capacity for analysis that it is possible to produce using a sound recording during a given time frame.

This advantage may prove to be decisive when it is not desired to connect the computer 2 to means for evaluating the speed of the vehicle, and when it is desired to obtain information on the condition of the road or of the vehicle autonomously.

For the sake of simplification and of speed in the execution of the calculations, it may be considered that the total power is equal to the sum of the mean powers within each of the frequency bands of the frequency interval in question.

Each of the points on the curve in FIG. 5 is a value representative of the mean acoustic power within a given frequency band. The whole set of these points may then constitute a vector in a vector space comprising as many dimensions as there are frequency bands. In the example used to support the present description, a vector comprising 21 dimensions is obtained by considering a frequency interval segmented by thirds of an octave and included within the frequency interval situated between 200 Hz and 20 KHz. It will furthermore be observed that the sum of the values forming the coordinates of a vector is equal to 1.

The choice of the frequency interval may itself be adapted according to whether it is desired to totally eliminate the noise generated by the engine, whose maximum amplitude is in the range between 50 Hz and 60 Hz, in which case a frequency interval in the range for example between 200 Hz and 20 KHz will be considered, or whether it is desired to conserve the part of the relevant information contained within the frequency range below 200 Hz, in which case the spectrum over the entire interval in the range between 0 Hz and 20 KHz will be taken into account.

The recording of the acoustic power during one time frame may be made based on a sampling at high frequency (around 40 kHz) of the acoustic signal.

The implementation of the invention comprises a prior learning phase, during which a large number of measurements are performed by varying, in a known manner, the parameters described hereinabove, and describing the weather conditions, the conditions on the road, the state of wear or the type of tread of the tyres. A vector obtained under the conditions described hereinabove is assigned to each of these measurements. In this way, a learning database specific to a vehicle is constituted.

The methods of analysis and of statistical processing of the data are known per se and are not a subject of this invention. The method of linear discriminating analysis which has been used has allowed reliable and robust results to be obtained.

A first step of this method consists in determining the main factorial axes which allow the number of dimensions to be reduced to the number that is just necessary to describe the vectors assigned to each of the measurements along orthogonal axes. The passage from the vector space whose number of dimensions is equal to the number of frequency bands, typically equal to 21 dimensions, into the reduced discriminating space is carried out by means of a linear transformation.

A second step then consists, by means of the discriminating analysis per se, in searching, within this reduced discriminating space, for the regions in which the measurements are situated that were obtained during the learning phase according to a given single parameter or according to a combination of parameters.

Here, 'combination of parameters' is understood to mean a condition representative of a given measurement carried out according to a parameter chosen within each of the classes. By way of example, a measurement carried out under the "wet" condition, on a "closed" road with a "summer" and "worn" tyre represents the parameter combination "wet-closed-summer-worn". The number of combined parameters is therefore equal to the product of the number of parameters within each of the classes.

Then, in this reduced discriminating space, the centre of gravity of the region in which the points representing a parameter or a combination of parameters are situated is calculated, together with a confidence interval representative of the dispersion of the points within the same region with respect to this centre of gravity.

In the example used to support the present description, the reduction in the number of dimensions between the starting discriminating space and the reduced discriminating space allows the initial 21 dimensions to be reduced to around 15 dimensions. This small reduction allows it to be observed that it is taking into account the total shape of the spectrum which is characteristic of the expression of the various parameters, and allows it to be considered that taking into account the powers from a reduced number of frequency bands does not allow a particular parameter relating to the road or the tyres to be isolated, with the exception of the parameters associated with the weather conditions on the road.

Figure 6:
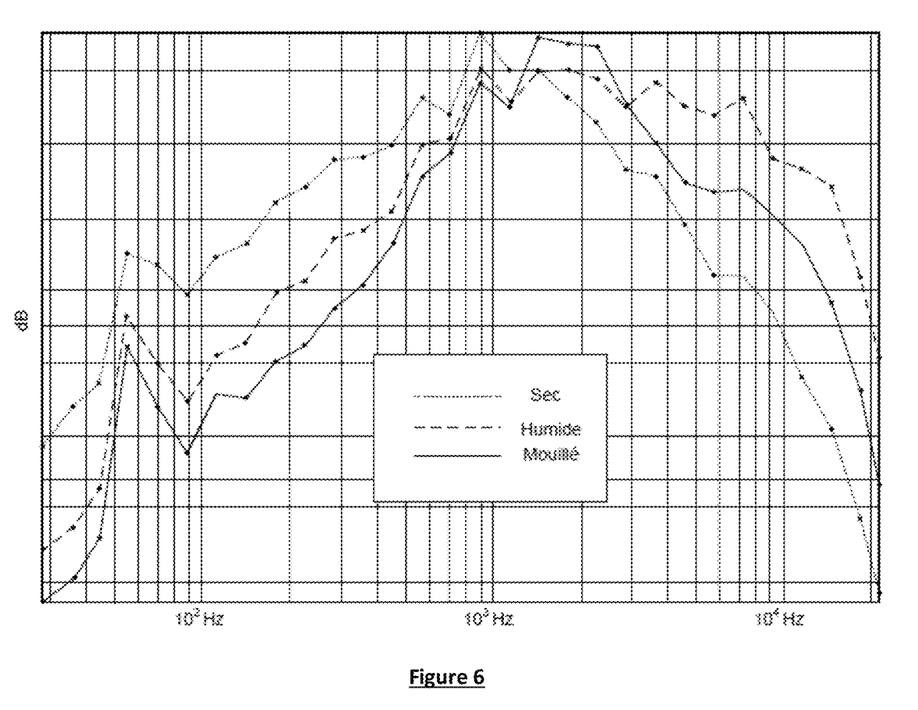
FIG. 6 shows the normalized mean power spectra for various weather conditions on the road.

FIG. 6 shows the spectral distribution of the "normalized" acoustic power, by frequency bands of ⅓ of an octave for three types of weather conditions on the road, all the parameters of the other classes being otherwise equal.

Figure 7:
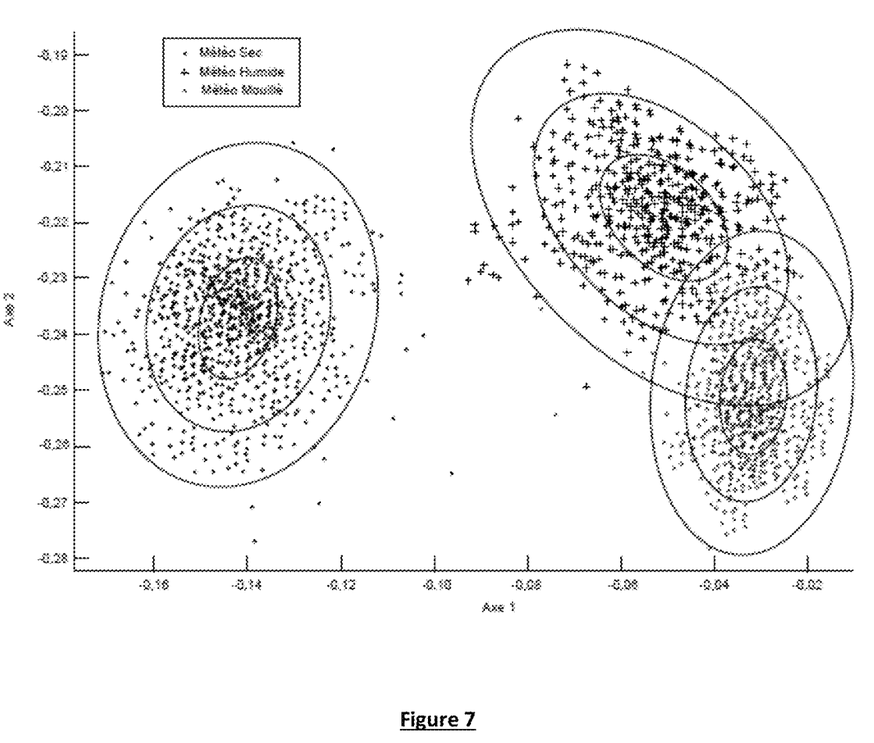
FIG. 7 shows a distribution of the measurements in a two-dimensional reduced discriminating space according to the weather conditions on the road.

FIG. 7 shows, in a two-dimensional space, the distribution of the measurements according to one of the parameters "dry", "damp", "wet" of the "weather" class of the road.

A first observation allows it to be observed that the measurements carried out on a dry ground do not overlap with the measurements carried out on a damp or wet ground. A second observation allows it to be concluded that it is possible to determine the weather conditions on the road independently of the parameters of the other classes with a high robustness.

The ellipses surrounding each of the clouds of points are placed at one, two and three standard deviations, and allow the dispersion of the measurements around the centre of gravity to be evaluated, and above all, allow the fractional overlap of one region with respect to another to be appreciated which is representative of the risk of erroneously assigning a measurement carried out according to a given different parameter to another parameter.

Using this data, it is also possible to determine the probability of a new measurement belonging to one of the three parameters of the "weather" class of the road by evaluating the distance from this point to the centre of gravity of each of these parameters.

Table 1 gives the probabilities of classification of the weather conditions on the road according to one of the three parameters "dry", "damp", "wet".

TABLE 1

| i | Pj | | |
|---|---|---|---|
| | J = Dry | J = Damp | J = Wet |
| i = Dry | 1 | 0 | 0 |
| i = Damp | 0 | 0.91 | 0.09 |
| i = Wet | 0 | 0.03 | 0.97 |

As can be seen, probabilities are obtained that are high enough for it to be concluded that the vehicle is travelling on a "dry", "damp" or "wet" road, and only the recognition of the parameter "damp" might be erroneously assigned to the parameter "wet" in 9% of cases.

Similarly, it would be possible to determine the macrotexture of the surfacing of the road, with a lower robustness than the weather conditions on the road, without a prior knowledge of the state of the tyres being necessary. However, it will be preferred to carry out this analysis when the road is dry. This observation suggests that certain acoustic phenomena associated with the macro-texture and with the reflection from the ground are independent of the nature of the tyres.

On the other hand, by carrying out similar analyses, it is observed that the regions containing the vectors relating to the parameters associated with the state of the tyres (wear or tread) are relatively dispersed and interpenetrate one another quite significantly (high dispersion around the centre of gravity, and close spacing of the centres of gravity), a fact which does not allow a conclusion to be drawn on a precise parameter without a high risk of an erroneous determination, in particular when the conditions on the road is "damp" or "wet".

Accordingly, in order to ensure a high robustness, the method includes a first analysis of the weather conditions on the road and, when it is observed that the vehicle is travelling on a "dry" ground, carries out a second analysis allowing the parameters relating to the surfacing of the road, to the state of wear of the tyres and to the type of tread of the tyres to be discriminated.

For a greater robustness, it then turns out to be preferable to carry out the discriminating analysis based on the combined parameters of the three classes. In the reduced discriminating space, the clouds of points are located that are representative of the vectors and of the measurements carried out according to a given combination of parameters chosen within each of the three classes of parameter "macro-texture of the road surface", "wear", "tread".

The parameters associated with the tread of the tyres are denoted "A" for a "winter" tyre and "P" for a "summer" tyre, the parameters of the state of wear are denoted "N" for a "new" tyre, "M" for a "half-worn" tyre and "U" for a "worn" tyre, and lastly, the parameters of the macro-texture of the road surface are denoted "f" for the "closed" parameter, "m" for the "medium" parameter and "o" for the "open" parameter. The 18 combined parameters are then respectively denoted: ANf, ANm, ANo, AMf, AMm, AMo, AUf, AUm, AUo, PNf, PNm, PNo, PMf, PMm, PMo, PUf, PUm, PUo.

Table 2 gives the probabilities obtained based on results of measurements contained in the learning database, for each of the 18 combinations of parameters. The dispersion of the measurements, observed for the parameters alone, is then much smaller for the combined parameters and allows a classification to be carried out in a much more efficient manner.

The overall probability of detection of one of the parameter combinations is around 0.96.

The next step consists in recognizing, for a given new measurement, the parameter of each of the classes "macro-texture of the road surface", "wear" and "tread" in which the measurement has been carried out.

Table 3 allows the probabilities of detection of the parameter from one of the three classes to be determined as a function of the combinations of parameters.

This Table 3 indicates that, if a measurement is assigned to the class "AUf" (Winter, Worn, closed surfacing), confidence in the determination of the tread (1), of the state of wear (U) and of the macro-texture of the road surface (1) is high. A lower relative confidence is obtained in the class "AUo" (Winter, Worn, open) for which the prediction on the type of tyre tread is not as good (0.91).

TABLE 3

| Class found | Probability of detecting the class | | |
|---|---|---|---|
| | Tread | Wear | Road surface |
| ANf | 1 | 0.95 | 0.98 |
| ANm | 1 | 0.99 | 1 |
| ANo | 0.96 | 1 | 1 |
| AMf | 0.98 | 0.95 | 1 |
| AMm | 0.97 | 0.96 | 1 |
| AMo | 0.99 | 0.96 | 0.99 |
| Auf | 1 | 1 | 1 |
| AUm | 0.98 | 0.98 | 1 |
| AUo | 0.91 | 1 | 1 |
| PNf | 0.98 | 0.95 | 1 |
| PNm | 0.99 | 0.98 | 1 |
| PNo | 1 | 1 | 1 |
| PMf | 1 | 0.97 | 1 |
| PMm | 0.97 | 0.98 | 1 |
| PMo | 1 | 1 | 1 |
| PUf | 1 | 0.97 | 1 |
| PUm | 0.94 | 0.97 | 1 |
| PUo | 0.87 | 0.97 | 1 |

Using the learning database, the regions are localized within which the combined parameters are situated in the reduced discriminating space, together with their centre of gravity and their dispersion. Typically, in the case of the

TABLE 2

| | ANf | ANm | ANo | AMf | AMm | AMo | AUf | AUm | AUo | PNf | PNm | PNo | PMf | PMm | PMo | PUf | PUm | PUo |
|---|---|---|---|---|---|---|---|---|---|---|---|---|---|---|---|---|---|---|
| ANf | 0.9 | 0.02 | | 0.03 | | | 0 | | | | | | | | | | | |
| ANm | | 0.99 | | | 0.01 | | | | | | | | | | | | | |
| ANo | | | 0.95 | | | | | | | | | 0 | | | | | | |
| AMf | | | | 0.95 | | | 0 | | | | | | 0 | | | | | |
| AMm | | 0.01 | | | 0.95 | | | 0.01 | | | | | | 0.01 | | | 0.03 | |
| AMo | | 0.03 | | | | 0.96 | | | | | | | | | | | | |
| AUf | | | | | | | 1 | | | | | | | | | | | |
| AUm | | | | | 0.01 | | | 0.97 | | | | | | 0.01 | | | 0.01 | |
| AUo | | | | | | | | | 0.91 | | | | | | | | | 0.1 |
| PNf | | | | | | | 0 | | | 1 | | | | | | 0 | | |
| PNm | | 0.01 | | | | | | | | | 0.97 | | | 0.02 | | | | |
| PNo | | | | | | | | | | | | 1 | | | | | | |
| PMf | | | | | | | | | | | | | 1 | | | 0 | | |
| PMm | | 0.01 | | | 0.02 | | | | | | 0.01 | | | 0.96 | | | | |
| PMo | | | | | | | | | | | | | | | 1 | | | |
| PUf | | | | | | | | | | | | | 0 | | | 1 | | |
| PUm | | | | | | | | 0.06 | | | | | | 0.03 | | | 0.91 | |
| PUo | | | 0.03 | | | | | | 0.1 | | | | | | | | | 0.9 | present description, the 18 regions of the 18 combined parameters in question are localized in the reduced discriminating space.

Then, using the localization of the vector associated with each new measurement and transformed into the reduced vector space, for each of the parameters of a class, a probability is determined for each of the parameter combinations containing this parameter, and the parameter of the class having the highest probability is assigned to this measurement.

Thus, if the weather class found is "dry", the 21 variables of the vector coming from the measurement allow, using the discriminating analysis based on the learning database, a probability of belonging to one of the combined parameters to be determined, according to the class "macro-texture of the road surface", the class "wear" or the class "tread", i.e. typically, in the case used to support the present description, the probability of belonging to one of the 18 classes of combined parameters: ANf, ANm, ANo, AMf, AMm, AMo, AUf, AUm, AUo, PNf, PNm, PNo, PMf, PMm, PMo, PUf, PUm, PUo. This probability is calculated by for example evaluating a distance with respect to the centre of gravity of the class of combined parameters in question.

The probability of the measurement belonging to one of the parameters of a particular class, other than the weather class, is then determined by means of a second probability calculation, called "tread+wear+surface texture on dry ground" model, in the following manner.

The probability of the macro-texture of the road surface parameter being "closed" is deduced from the relationship $p(\text{macro-texture}=\text{"closed"})=p(\text{"closed"})=p(ANf)+p(AMf)+p(AUf)+p(PNf)+p(PMf)+p(PUf)$ Similarly, the following is deduced:

$p(\text{macro-texture}=\text{"medium"})=p(\text{"medium"})=p(ANm)+p(AMm)+p(AUm)+p(PNm)+p(PMm)+p(PUm)$, and $p(\text{macro-texture}=\text{"open"})=p(\text{"open"})=p(ANo)+p(AMo)+p(AUo)+p(PNo)+p(PMo)+p(PUo)$.

From the three probabilities, that is then sought which is maximum and which gives the parameter of the macro-texture of the road surface detected and the associated probability:

$p(\text{macro-texture})=\max[p(\text{"closed"}),p(\text{"medium"}),p(\text{"open"})]$.

Similarly, p(tread=max [p("Winter"), p("Summer")] with:

$p(\text{tread}=\text{"Winter"})=p(\text{"Winter"})=p(ANf)+p(ANm)+p(ANo)+p(AMf)+p(AMm)+p(AMo)+p(AUf)+p(AUm)+p(AUo)$ and $p(\text{tread}=\text{"Summer"})=p(\text{"Summer"})=p(PNf)+p(PNm)+p(PNo)+p(PMf)+p(PMm)+p(PMo)+p(PUf)+p(PUm)+p(PUo)$.

Finally, the wear is given by p(wear=max [p("new"), p("half-worn"), p("worn")] with:

$p(\text{wear}=\text{"new"})=p(\text{"new"})=p(ANf)+p(ANm)+p(ANo)+p(PNf)+p(PNm)+p(PNo)$, $p(\text{wear}=\text{"half-worn"})=p(\text{half-worn})=p(AMf)+p(AMm)+p(AMo)+p(PMf)+p(PMm)+p(PMo)$ and, $p(\text{wear}=\text{"worn"})=p(\text{"worn"})=p(AUf)+p(AUm)+p(AUo)+p(PUf)+p(PUm)+p(PUo)$.

The probability of assignment to a parameter coming from a given measurement is then compared with a given threshold in order to decide on the validity of the result found and on its transmission to a display system or system for driving assistance. By way of example, all the detections whose probability of classification is not at least equal to 0.75 are rejected, and if this probability is in the range between 0.75 and 0.95, the result coming from the measurement must be confirmed by one or more subsequent measurements.

It will be observed here that, in contrast to the weather conditions or to the macro-texture of the surfacing of the road which can change abruptly and which require decisions to be taken quickly, the variation of the wear or the type of tread of the tyres are factors that are much more stable over time, typically over time scales corresponding to distances travelled of 100s of kilometres or even of 1000s of kilometres. However, as the detection of these tyre parameters depends on the state of the road, this leads to the paradox that they need to be detectable almost as quickly as the conditions on the road.

The probability of an erroneous determination of these two criteria may be greatly reduced by cumulating the observations obtained by means of several consecutive measurements, before deciding on the real state of wear or on the type of tyre tread mounted on the vehicle.

The embodiments of the invention used as a basis for the present description are non-limiting, and may be subject to variants of implementation, in particular in the choice of the methods for digital data analysis, as long as they allow the technical effects such as described and claimed to be obtained.

The invention claimed is:

1. A method for mapping data relating to a condition on a road, the method comprising the following steps:
   a step of recording, in a database, information, determined by a vehicle travelling on a road, relating to a weather condition on the road;
   a step of recording a GPS position of the vehicle corresponding to the recorded information relating to the weather condition on the road; and
   a step of displaying, on a map showing a route followed by the vehicle, the weather condition as a function of the GPS position,
   wherein the determination by the vehicle of the information relating to a weather condition on the road comprises the following steps:
   (1) a step wherein a measurement of an acoustic signal produced by the tires of the vehicle travelling over a surface of the road is recorded during a given time frame,
   (2) a step wherein a spectral power density of the acoustic signal is determined over a given frequency interval,
   (3) a step wherein the frequency interval is segmented into a plurality of frequency bands with previously determined widths, and with each frequency band is associated a data value representative of a measured mean acoustic power within the frequency band, wherein the plurality of representative data values that were obtained from a measurement form variables of a vector associated with the measurement, and
   (4) a step wherein a condition of the road and of the tires is determined in accordance with the vector associated with the measurement, by means of a discriminating analysis of the vector based on a learning database formed from a set of vectors associated with measurements previously carried out and recorded, according to steps (1) through (3), under known driving conditions according to parameters each representing a given condition of the road and of the tires, wherein the representative data values forming the variables of the vector associated with a measurement are obtained by determining a ratio between the measured mean acoustic power within a frequency band and a measured total acoustic power over the entirety of the frequency interval.

2. The method according to claim 1, wherein the weather condition is included within the group comprising: a dry condition, a damp condition, a wet condition, and a wintery condition.

3. The method according to claim 1, wherein, during the information recording step, information is also recorded relating to a macro-texture of a surface of the road, and
wherein the displaying step further comprises displaying a representation of the macro-texture.

4. The method according to claim 3, in which the macro-texture of the road surface is included within the group comprising a closed state, a medium state, and an open state.

5. The method according to claim 1, wherein, during the information recording step, information is also recorded relating to a sudden event affecting a state of the road, and
wherein the displaying step further comprises displaying a representation of the sudden event.

6. The method according to claim 1, further comprising:
a step of estimating, as a function of the recorded information and of the recorded GPS position, road-holding properties of the road; and
a step of displaying the road-holding properties on a map of the route.

7. The method according to claim 1, further comprising:
a step of determining, as a function of the recorded information and of the recorded GPS position, acoustic properties of a surface of the road over a route; and
a step of displaying the acoustic properties on a map.

8. The method according to claim 1, further comprising:
a step of determining, as a function of the recorded information, areas of deterioration of a surface of the road; and
a step of displaying the areas of deterioration on a map.

9. The method according to claim 1, wherein, during the information recording step and the GPS position recording step, information and GPS positions coming from a plurality of different vehicles are recorded, and
wherein the method further comprises a step of organizing the recorded information and the recorded GPS positions coming from the plurality of different vehicles in order for the recorded information and the recorded GPS positions coming from the plurality of different vehicles to be displayed in the form of a single map for all of the plurality of different vehicles.

10. The method according to claim 1, further comprising a step of recording, aside from the GPS position of the vehicle, the date and the time of the recording.

11. The method according to claim 6, further comprising a step of updating the display if the recorded information relates to a segment of road for which information has already been displayed, in accordance with the recorded information having a date and a time that is later than that of the information having been previously displayed.

12. The method according to claim 1, wherein the measured total acoustic power is equal to a sum of the mean acoustic powers of all the frequency bands of the frequency interval.

13. The method according to claim 1, wherein the plurality of frequency bands are determined by dividing up the frequency interval by thirds of an octave.

14. The method according to claim 1, wherein the discriminating analysis includes:
(a) a step in which, using the learning database, a reduced discriminating space is determined in which regions formed by each parameter or combination of parameters are identified; and
(b) a step in which the vector associated with a measurement in the reduced discriminating space is transformed and, depending on the location of the said vector, a probability is associated with the measurement according to each of the parameters or combinations of parameters; and
(c) a step in which the most probable parameter is determined according to each of a plurality of classes of the parameters.

15. A method according to claim 2, wherein the wintery condition is a snow-covered condition or an icy condition.

16. The method according to claim 14, wherein the parameters are selected from a group including dry, damp, wet, closed, open, medium, worn, half-worn, new, summer, and winter,
wherein the combinations of parameters are selected from a group including ANf, ANm, ANo, AMf, AMm, AMo, AUf, AUm, AUo, PNf, PNm, PNo, PMf, PMm, PMo, PUf, PUm, and PUo, where A represents winter, P represents summer, N represents new, M represents medium, U represents worn, F represents closed, m represents medium, o represents open, and
wherein the plurality of classes of parameters comprises weather, macro-texture of the road surface, wear, and tread.

17. A method for mapping data related to a condition on a road, the method comprising the following steps:
a step of recording, in a database, information, determined by a vehicle travelling on a road, relating to a weather condition on the road;
a step of recording a GPS position of the vehicle corresponding to the recorded information relating to the weather condition on the road;
a step of displaying, on a map showing a route followed by the vehicle, the weather condition as a function of the GPS position; and
a step of determining information relating to a macro-texture of a surface of the road by performing steps comprising:
(1) a step wherein a measurement of an acoustic signal produced by the tires of the vehicle travelling over a surface of the road is recorded during a given time frame,
(2) a step wherein a spectral power density of the acoustic signal is determined over a given frequency interval,
(3) a step wherein the frequency interval is segmented into a plurality of frequency bands with previously determined widths, and with each frequency band is associated a data value representative of a measured mean acoustic power within the frequency band, wherein the plurality of representative data values that were obtained from a measurement form variables of a vector associated with the measurement, and
(4) a step wherein a condition of the road and of the tires is determined in accordance with the vector associated with the measurement, by means of a discriminating analysis of the vector based on a learning database formed from a set of vectors associated with measurements previously carried out and recorded, according to steps (1) through (3), under known driving conditions according to parameters each representing a given condition of the road and of the tires, wherein the representative data values forming the variables of the vector associated with a measurement are obtained by determining a ratio between the measured mean acoustic power within a frequency band and a measured total acoustic power over the entirety of the frequency interval.

* * * * *